Aug. 19, 1969   J. A. KALLEVIG ET AL   3,462,014
CONTROL APPARATUS

Filed May 15, 1967   2 Sheets-Sheet 1

INVENTORS.
JOHN A. KALLEVIG
NEIL C. SHER
BY
Ronald T. Reiling
ATTORNEY

Aug. 19, 1969    J. A. KALLEVIG ET AL    3,462,014
CONTROL APPARATUS

Filed May 15, 1967    2 Sheets-Sheet 2

INVENTORS.
JOHN A. KALLEVIG
NEIL C. SHER
BY
Ronald T. Reiling

United States Patent Office 3,462,014
Patented Aug. 19, 1969

3,462,014
CONTROL APPARATUS
John A. Kallevig and Neil C. Sher, St. Paul, Minn., assignors to Honeywell Inc., Minneapolis, Minn., a corporation of Delaware
Filed May 15, 1967, Ser. No. 638,477
Int. Cl. B07c 9/00, 3/12
U.S. Cl. 209—72      5 Claims

ABSTRACT OF THE DISCLOSURE

This application discloses a control system for the inspection and rejection of a plurality of devices which move sequentially through a plurality of testing stations. The system includes memory elements to store information conveyed from the inspection stations and to convey such information to the rejection station. Both a fluidic system and an electrical system are disclosed.

Background of the invention

The applicants' invention generally pertains to the field of art of classifying, separating, and assorting solids and more particularly to automatically assorting and discharging solids.

There are various prior art control systems for assorting solids or devices. When a plurality of devices require two or more inspections to establish acceptance, it is necessary to provide memory means for signal storage. The prior art systems utilize many components and extremely complex circuitry and electromechanical mechanisms to provide this memory or fluid storage capability. This results in complex, expensive and unreliable type control systems.

Summary

The applicants' invention comprises a control apparatus for inspecting and rejecting a plurality of devices. The devices are moved sequentially through a plurality of stations including at least one testing station and a rejection station. The invention includes a plurality of memory elements and means for sequentially connecting each memory element to the stations. Each testing station provides a signal indicative of the device positioned therein to the memory element. The memory element conveys an information signal indicative of the condition of the device to the rejection station when that device is positioned therein so as to reject the device if necessary. Means are also provided for resetting the memory elements.

The applicants' invention is much simpler, much more reliable, and much less expensive than the prior art systems. The applicants' unique manner of sequentially connecting each memory element to the stations allows the applicants' to utilize only a single memory element for each station.

Description of the preferred embodiments

Figure 1:
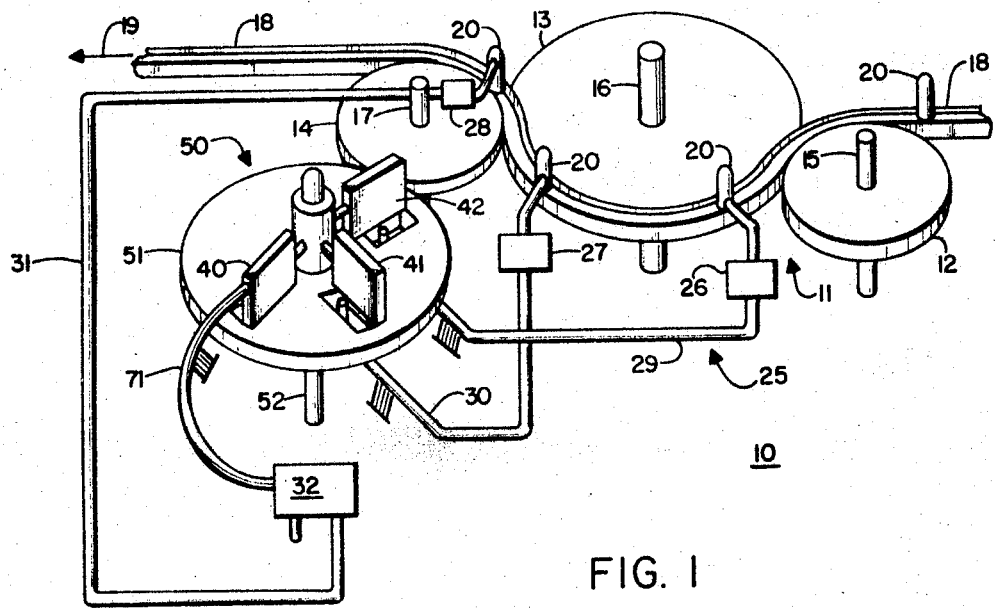
FIGURE 1 is a schematic representation of one embodiment of the applicants' system.

Referring now to FIGURE 1, reference numeral 10 generally depicts the applicants' control apparatus. Means 11 are provided for moving a plurality of devices 20 along a predetermined path. Means 11 includes wheels 12, 13 and 14 rotatable about their parallel shafts 15, 16, 17. Suitable means (not shown) are provided to support shafts 15, 16, and 17 for rotation. Means 11 also includes a conveyor belt 18 adjacent to the periphery of wheels 12, 13 and 14 as illustrated in FIGURE 1. Suitable means are provided (not shown) which drive conveyor belt 18 in the direction of arrow 19. The linear velocity of each point of wheels 12, 13 and 14 in contact with conveyor belt 18 is the same as the velocity of the belt. The applicants do not want to be limited to the particular means 11 illustrated in FIGURE 1, any suitable means may be utilized to move the plurality of devices.

A plurality of stations 25 are provided contiguous conveyor belt 18. Stations 25 include test stations 26, 27 and reject station 28. Test stations 26 and 27 typically test the size, weight, or pressure, etc. of the devices on conveyor belt 18. In this particular embodiment, test stations 26 and 27 provide a fluid signal indicative of the condition of the particular device 20 positioned within the test station. Various test stations are commercially available. The fluid signal from test station 26 is fed through a conduit 29 and the signal from test station 27 is fed through a conduit 30. Of course, any number of test stations may be positioned contiguous conveyor belt 18; only two stations are illustrated herein for clarity. Reject station 28 is connected to a fluid power source (not shown) through a fluid conduit 31 and a fluid amplifier 32. Reject station 28 is operable to remove a device from conveyor belt 18. There are many such stations commercially available. More than one rejection station may be utilized.

A plurality of memory elements 40, 41, and 42 are provided. In this particular embodiment, memory elements 40–42 are fluidic bistable devices and will be more fully explained hereinafter.

Figure 2:
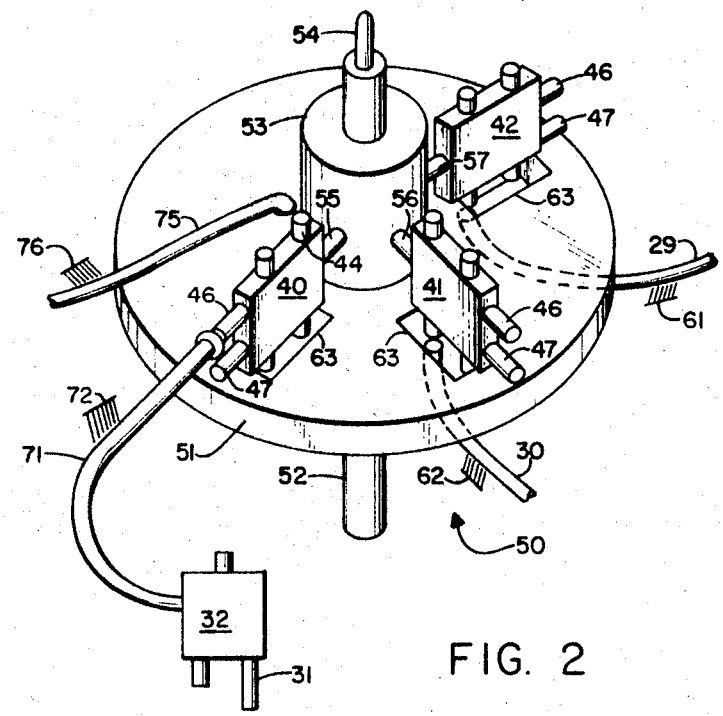
FIGURE 2 is an enlarged view of the memory elements in the system.

Referring now to FIGURE 2, means 50 is provided for sequentially connecting each memory element to the plurality of stations. In this particular embodiment, means 50 includes a moving member 51 mounted on a shaft 52. Shaft 52 is positioned parallel to shaft 16 and mounted for rotation about its longitudinal axis by suitable means (not shown). Moving member 51 is in contact with the periphery of wheel 14 and rotates therewith. Moving member 51 has a diameter greater than that of wheel 14 so that memory elements 40–42 move at the same velocity as conveyor belt 18. This is only one way of synchronizing the memory elements with the devices on conveyor belt 18; other approaches include gearing belt drives, etc. A manifold 53 surrounds the upper end of shaft 52. Manifold 53 is connected to a source of fluid pressure (not shown) through a coupling 54. Manifold 53 has a plurality of outlets 55, 56, 57 which supply fluid to memory elements 40, 41, 42.

Figure 3:
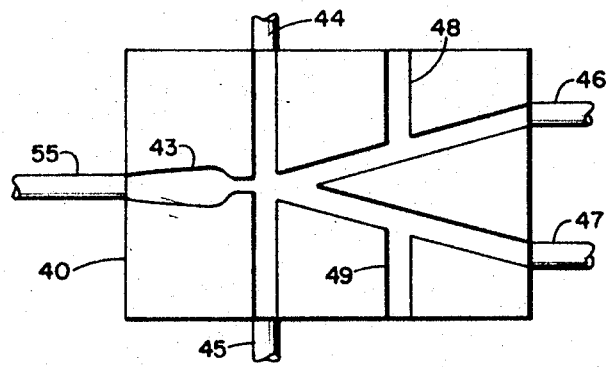
FIGURE 3 is a cross sectional view of a memory element.

Memory elements 40–42 are all identical and a cross section of one memory element 40 is illustrated in FIGURE 3. Memory element 40, in this embodiment, comprises a fluidic bistable device or pure fluid bistable amplifier. In other embodiments, the memory elements may be electrical, mechanical, fluidic, or any other type of bistable device. Memory element 40 includes a supply nozzle 43 in fluid communication with outlet 55 of manifold 53. A pair of control passages 44 and 45 and a pair of outlet passages 46 and 47 are provided. Outlet passages 46, 47 are vented as at 48, 49. In operation of this particular embodiment, fluid at a pressure of three inches of mercury is supplied from manifold 53 through outlet 55 to supply nozzle 43. Various other pressure levels may be utilized. In the absence of any input signal to control passages 44, 45, the fluid stream flowing from supply nozzle 43 flows out of outlet passage 47. Fluid continues to flow out of outlet passage 47 until a signal is received in control passage 45 switching the flow to outlet passage 46. Since memory element 40 is a bistable device, the fluid flow remains in outlet passage 46 even after the control signal in control passage 45 is removed. Thus, the fluid flow remains in outlet passage 46 until a control signal is received in control passage 44 switching the fluid flow to outlet passage 47. Vents 48 and 49 merely optimize the operation of the amplifier and need not be utilized.

Conduit 29, which is in communication with test station 26, terminates just below moving member 51 and is held stationary or fixed as at 61. Conduit 30, which is in communication with test station 27, terminates just below moving member 51 and is held stationary or fixed as at 62. An aperture 63 is cut through moving member 51 beneath the control passage 45 of each memory element. A conduit 71, which is in communication with reject station 28 through amplifier 32 and conduit 31, is held stationary or fixed as at 72 and is contiguous the periphery of moving member 51. Conduit 71 is aligned with outlet passage 46 of memory element 40 in FIGURE 1. As moving member 51 rotates about shaft 52, conduit 71 will be aligned sequentially with the outlet passages 46 of memory elements 40–42. Thus means 50 is effective to sequentially connect each memory element to the stations. This allows the applicants to utilize only a single memory element for each station. When many stations are utilized, a plurality of moving members can be stacked on shaft 52, or an endless belt can be utilized.

A reset conduit 75 is fixed as at 76 in a stationary position above moving member 51. Reset conduit 75 is positioned such that it will be sequentially in communication with control passage 44 of memory elements 40–42. It should be noted that reset conduit 75 is positioned such that it is in communication with control passage 44 of the memory elements only after they pass conduit 71 of reject station 28.

In operation, coupling 54 of manifold 53 is connected to a suitable source of fluid pressure so as to energize memory elements 40–42. Fluid amplifier 32 is also connected to a suitable source of fluid pressure. Wheels 12, 13, 14 are rotated so as to cause conveyor belt 18 to move in the direction of arrow 19. Thus, means 11 moves a plurality of devices 20 sequentially through the stations. Moving member 51 is in contact with wheel 14. In this manner, moving member 51 is synchronized with conveyor belt 18 so that each memory element is sequentially connected to the stations at the time the same device is located therein. As illustrated in FIGURE 1, memory element 42 is in communication with testing station 26 through conduit 29 at the time a device 20 is located in station 26. As conveyor belt 18 moves in the direction of arrow 19, moving member 51 rotates about shaft 52. When the same device that was in station 26 is moved by means 11 to station 27, memory element 42 rotates into a position to be in communication with station 27 through conduit 30. When the same device is moved by means 11 to station 28, memory element 42 moves to a position to be in communication with reject station 28 through conduit 71, fluid amplifier 32, and conduit 31. Thus means 50 is effective to sequentially connect each memory element to the stations so that each memory element receives a signal indicative of the condition of the device in each test station and conveys an information signal indicative thereof to the reject station when the device is positioned therein.

More specifically, let's assume that a device 20 is found defective in the particular condition being tested in test station 26. In this particular embodiment, an information signal (fluid pressure) will be conveyed at that time through conduit 29 to control passage 45 of memory element 42. This signal will switch memory element 42 so that the fluid is flowing out of outlet passage 46. Device 20 is then moved by means 11 to test station 27 and means 50 is effective to position memory element 42 in communication with test station 27 through conduit 30 by rotating moving member 51 about shaft 52. Let us assume that device 20 passes the condition being tested in test station 27. In this particular embodiment, an information signal indicating a satisfactory device is the lack of a fluid pressure signal in control conduit 45 of memory element 42. However, since memory element 42 was previously switched to outlet passage 46 it remains in outlet 46 after the signal from station 26 is removed and until a signal is received in control passage 44. Hence the signal from test station 27 does not change memory element 42 and the fluid flow continues out of outlet passage 46. Device 20 is moved by means 11 on to reject station 28. At this time memory element 42 is in communication with reject station 28 through conduit 71, fluid amplifier 32, and conduit 31. The fluid signal from outlet passage 46 is conveyed through conduit 71 so as to switch amplifier 32 and cause a fluid pressure to be directed through conduit 31 forcing device 20 off of conveyor belt 18 and into a rejection area. It is clear that if a device passes all of the conditions tested at the test stations, the memory element will not be switched and the reject station will not be energized. Thus, the applicants have provided a unique, low-cost, highly reliable control system for inspecting and rejecting a plurality of devices.

Figure 4:
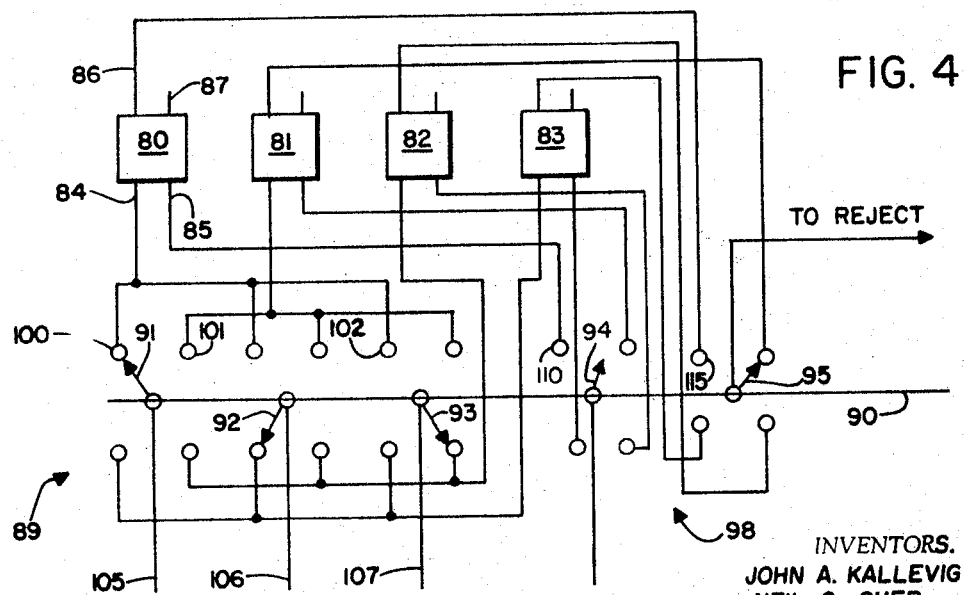
FIGURE 4 is a schematic representation of an alternate embodiment of the applicants' invention.

An alternate embodiment of the applicants' invention is illustrated in FIGURE 4. The applicants' unique approach of utilizing means for sequentially connecting each memory element to the stations is utilized in an electrical control system in FIGURE 4. The electrical system will utilize the same means 11 for moving the plurality of devices through a sequence of stations as illustrated in FIGURE 1 and this portion of the system will not be explained again. The test stations in this particular embodiment will provide an electrical signal. There are various commercially available test stations which may be utilized.

A plurality of electrical memory elements or flip-flops 80, 81, 82, and 83 are provided. All the memory elements are identical and only memory element 80 will be explained in detail. Memory element 80 has a set input 84, a reset input 85, a one output 86, and a zero output 87.

The means 89 for sequentially connecting each memory element to the stations in this embodiment comprises a rotatable shaft 90 having a plurality of switch contacts 91, 92, 93, 94, and 95 thereon. Shaft 90 is connected to or synchronized with means 11. Each memory element has a plurality of set input contacts, corresponding to the number of testing stations, connected to the set input thereof. Looking at memory element 80, set input contacts 100, 101, and 102 are connected to set input 84. Switch contacts 91, 92, and 93 periodically engage contacts 100, 101, and 102 as shaft 90 rotates. Switch contacts 91, 92, 93 are connected to the inputs from test stations 105, 106, 107 respectively.

Means 98 are provided for resetting each memory element. The reset input of each memory element is connected to a reset contact. Switch contact 94 periodically engages the reset contacts. Memory element 80, for example, has its reset input 85 connected to reset contact 110.

The one output of each memory element is connected to a reject contact. Switch contact 95 periodically engages the reject contacts. More specifically, memory element 80, for example, has output 86 connected to reject contact 115. Switch contact 95 is connected by a suitable lead to the rejected station. Thus means 89 is effective to sequentially connect each memory element with the stations when the device is positioned therein.

In operation of the embodiment of FIGURE 4, assume that a device is positioned in the test station 105. Should a reject signal be generated from test station 105 it will be transmitted through switch contact 91, set input contact 100, set input 84 to memory element 80. This will switch memory element 80 from its normal condition of zero output at 87 to a one output 86. The signal appearing at one output 86 is conveyed to reject contact 115. If there is no reject signal from testing station 105, memory element 80 remains in the zero output condition and there is no signal conveyed to reject contact 115. When means 11 moves the device from test station 105 to test station 106, switch contact 92 moves into contact with set input contact 101. When the device is in test station 107, switch contact 93 moves into contact with set input contact 102. As the device moved into the rejection station, switch contact 95 moves in engagement with reject contact 115. If a reject signal is present at reject contact 115, the device is rejected. After the device leaves the reject station, switch contact 94 moves into contact with the reset contact 110, resetting the memory element 80 to the zero output condition.

Although the invention has been described and illustrated in detail, it is to be understood that the same is by way of illustration and example only and is not to be taken by way of limitation.

We claim:
1. Control apparatus comprising:
   a plurality of stations including at least one test station and a reject station;
   means for moving a plurality of devices sequentially through said stations, each testing station providing a signal indicative of the condition of the device positioned therein;
   a plurality of memory elements, each including a fluidic bistable device;
   means for sequentially connecting each memory element to said stations so that one memory element receives a signal indicative of the condition of the same device in each testing station and conveys an information signal indicative thereof to said reject station when the same device is positioned therein; and
   means for providing a reset signal to each memory element after it has conveyed the information signal to said reject station.

2. The apparatus of claim 1 wherein said test stations each provide a fluid signal indicative of the condition of the device positioned therein.

3. The apparatus of claim 2 wherein said reject station is operable in response to a fluid signal.

4. In an apparatus for moving a plurality of devices sequentially through a plurality of test stations which provide signals indicative of a condition of each device positioned therein, and a reject station for separating a defective device from the acceptable devices wherein the improvement comprises a movable member having a plurality of fluidic bistable memory elements mounted thereon including one memory element for each device, said member moving such that said one memory element is in communication with each test station whenever said each device is located in said test station, said one memory element storing said signal from said test station, said one memory element being in communication with said reject station whenever said each device is located in said reject station, said one memory element transferring said signal to said reject station, and said one memory element being in communication with reset means after said each device leaves said reject station.

5. The apparatus of claim 4 wherein said test stations each provide a fluid signal indicative of a condition of each device positioned therein.

References Cited

UNITED STATES PATENTS

| 2,244,826 | 6/1941 | Cox | 209—74 |
| 3,107,788 | 10/1963 | Thiele | 209—75 |
| 3,182,797 | 5/1965 | Palmer | 209—74 |
| 3,241,668 | 3/1966 | Schonfeld | 209—110 |

M. HENSON WOOD, JR., Primary Examiner

R. A. SCHACHER, Assistant Examiner

U.S. Cl. X.R.

209—74, 75